United States Patent [19]

Reiffin

[11] Patent Number: 5,694,604
[45] Date of Patent: *Dec. 2, 1997

[54] PREEMPTIVE MULTITHREADING COMPUTER SYSTEM WITH CLOCK ACTIVATED INTERRUPT

[76] Inventor: Martin G. Reiffin, 5439 Blackhawk Dr., Danville, Calif. 94506

[ * ] Notice: The term of this patent shall not extend beyond the expiration date of Pat. No. 5,694,603.

[21] Appl. No.: 217,669

[22] Filed: Mar. 25, 1994

Related U.S. Application Data

[63] Continuation of Ser. No. 496,282, Mar. 20, 1990, which is a continuation of Ser. No. 425,612, Sep. 28, 1982, abandoned, and Ser. No. 719,507, Apr. 3, 1985, abandoned.

[51] Int. Cl.⁶ ......................................................... G06F 9/46
[52] U.S. Cl. ...................................................... 395/677
[58] Field of Search ...................................... 395/375, 650, 395/677, 678

[56] References Cited

PUBLICATIONS

Cheriton, David Ross, "Multi-Process Structuring and the Thoth Operating System," Doctorial Thesis, University of Waterloo, 1978.
Lorin, Harold, "Parallelism in Hardware and Software, Real and Apparent Concurrency," Prentice–Hall Inc., 1972, p. 43.
Cheriton et al., "Thoth, a Portable Real–Time Operating System," Department of Computer Science, University of Waterloo, Mar. 1978.
Hiromoto, Robert, *Parallel–processing a large scientific problem*, AFIPS Press. 1982, pp. 235–237.
Ousterhout, John K., *Scheduling techniques for Concurrent Systems*, IEEE, 1982, pp. 22–30.
Andrews, Gregory R., *Synchronizing Resources*, ACM Transactions on Programming Languages and Systems, vol. 3, No. 4, Oct. 1981, pp. 405–430.
Colin, A.J.T., *The Implementation of STAB–1*, Software –Practice and Experience, vol. 2, 1972, pp. 137–142.
Artym, Richard, *The STAB Multiprocessing Environment for CYBA–M*, Software –Practice and Experience, vol. 12, 1982, pp. 323–329.
Treleaven et al., *Combining Data Flow and Control Flow Computing*, The Computer Journal, vol. 25, No. 2, 1982, pp. 207–217.
Duffie, C. A. III, *Task Scheduling Algorithm for a Teleprocessing Communications Controller*, IBM Technical Disclosure Bulletin, vol. 16, No. 10, Marcy 1974, pp. 3349–3352.
Hoare, C. A. R., *Towards a Theory of Parallel Programming*, Operating Systems Techniques, Proceedings of a Seminar held at Queen's University, Belfast, 1972, Aademic Press, 1972, pp. 61–71.

*Primary Examiner*—Richard L. Ellis

[57] ABSTRACT

A multithreading computer system provides concurrent asynchronous preemptive time-sliced execution of a plurality of threads of instructions located within the same software program. A clock or timer periodically activates the interrupt operation of the central processor. Each interrupt preempts an executing thread after the thread has executed for a brief timeslice during which the thread may have performed only a portion of its task. Control of the processor is thereby taken away from the preempted thread, and control then passes to an interrupt service routine which then passes control to another thread to invoke the latter for execution during the next timeslice. Control is thereafter returned to the preempted thread to enable the latter to resume execution at the point where it was previously interrupted. Control of the processor is thus transferred repeatedly back and forth between the threads so rapidly that the threads are run substantially simultaneously. The threads may thus execute incrementally and piecewise with their successive task portions executed alternately in a mutually interleaved relation and with each thread executed during its respective series of spaced timeslices interleaved with the timeslices of at least one other thread.

36 Claims, 9 Drawing Sheets

SYSTEM

COMPILER

EDITOR

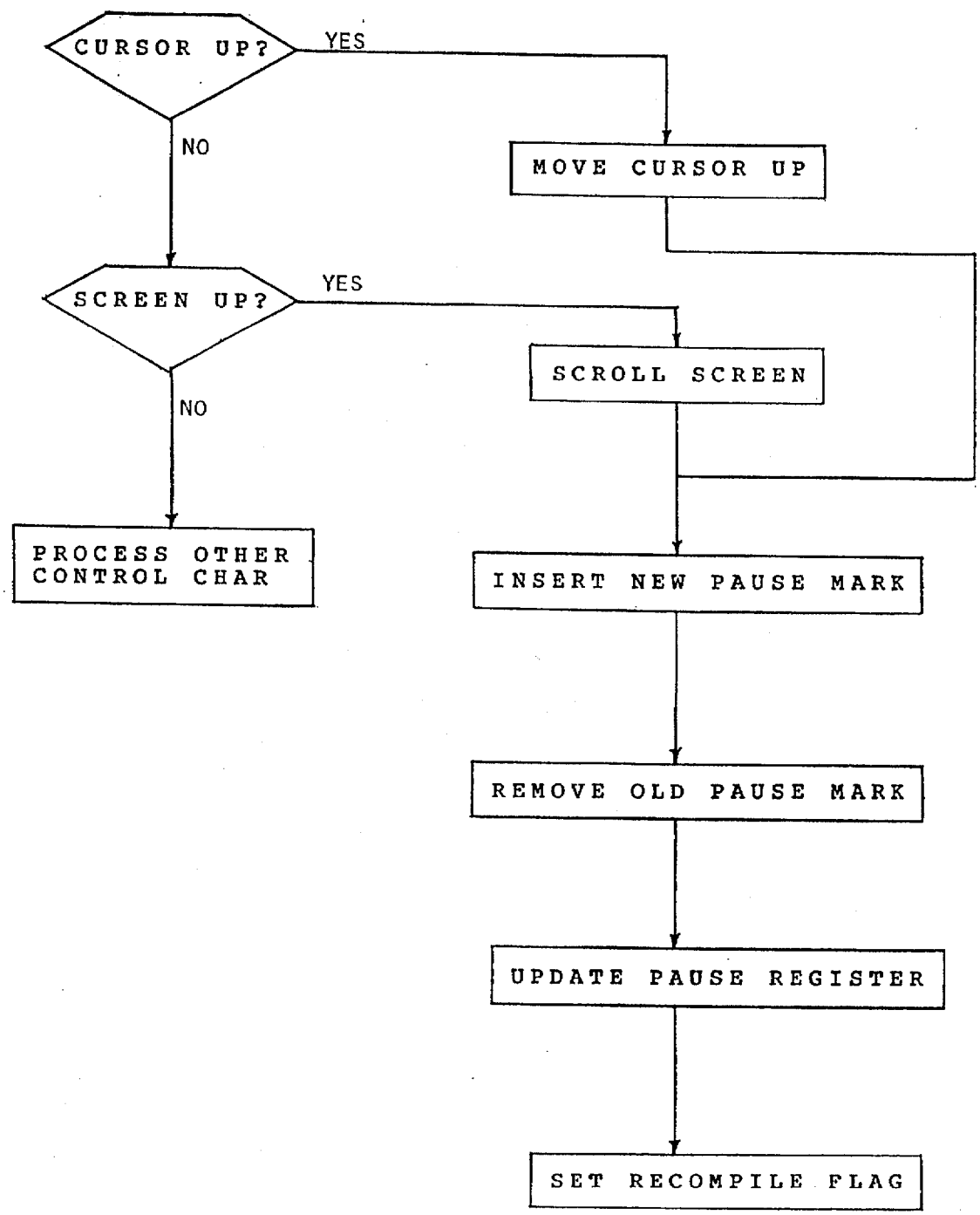

PREEMPTIVE MULTITHREADING COMPUTER SYSTEM WITH CLOCK ACTIVATED INTERRUPT

PRIOR APPLICATIONS

This application is a continuation of my prior copending application Ser. No. 07/496,282 filed Mar. 20, 1990 which application was in turn a continuation of my prior applications Ser. No. 06/425,612 filed Sep. 28, 1982 and abandoned Apr. 5, 1990, and Ser. No. 06/719,507 filed Apr. 3, 1985 and abandoned Jun. 8, 1991. The disclosed structure and operation of the present application as filed are identical to those of said three prior applications and support the claims of the present application which is therefore entitled to an effective filing date of Sep. 28, 1982.

This invention relates to a multithreading computer system, and more particularly, to a computer system with clock activated interrupt for asynchronous preemptive execution of a multithreaded software program having a plurality of concurrent instruction threads each executable in a series of successive spaced timeslices alternately interleaved with the timeslices of another thread so that the threads are effectively executed simultaneously.

SUMMARY OF THE ILLUSTRATIVE EMBODIMENT

The term "multithreading" is used in this specification in its ordinary generally understood sense to mean the concurrent asynchronous preemptive time-sliced execution of a plurality of threads of instructions located within the same software program, controlled by a clock or timer which periodically activates the interrupt operation of the central processor. That is, each interrupt preempts an executing thread after the thread has executed at most for a brief timeslice during which the thread may have performed only a portion of its task. Control of the processor is thereby taken away from the preempted thread, and control then passes to an interrupt service routine which then passes control to another thread to invoke the latter for execution during the next timeslice. Control is thereafter returned to the preempted thread to enable the latter to resume execution at the point where it was previously interrupted. The term "multithreading" in each claim is to be understood as defined by the respective limitations reeked in that particular claim.

The operation termed "multithreading" provides that control of the processor is thus transferred repeatedly back and forth between the threads so rapidly that the threads are run substantially simultaneously. The threads may thus execute incrementally and piecewise with their successive task portions executed alternately in a mutually interleaved relation and with each thread executed during its respective series of spaced timeslices interleaved with the timeslices of at least one other thread.

To illustrate one of the many uses of the novel multithreading mode of operation of the invention there is disclosed an embodiment providing for real-time processing of data code concurrently as the code is being entered at the keyboard by an operator. In this illustrative example, one of the program threads is an editor and another thread is a code processing routine in the form of a compiler. As the operator strikes keys at the keyboard the compiler thread executes between each successive pair of keystrokes to process the entered source code concurrently with the editing operation. By the time the operator has finished entering or editing the code the compiler thread will have completed most of the required processing, thereby freeing the operator from lengthy periods of waiting for extensive code processing.

In the preferred embodiment claimed in the present application the interrupt operation of the central processor is periodically activated by a timer or clock and species. Each interrupt operation asynchronously preempts the executing compiler thread and passes control of the central processor to an interrupt service routine. The input port is then polled to test if a key has been struck. If not, the interrupt is terminated and control returns to the compiler. If polling the port reveals that a key has been struck then the interrupt service routine invokes the editor thread which takes control of the central processor to perform a character code entry or other edit operation. For most applications clock interrupts at intervals of about every 10 to 30 milliseconds are frequent enough to keep up with keys stroked at the keyboard.

It will be readily apparent to those skilled in the art that the novel multithreading system of the present invention may be implemented in other applications and may provide other uses and advantages.

DESCRIPTION OF THE DRAWINGS

FIG. 6 is a flowchart showing the sequence of operations of the control-character routines of the editor thread.

DETAILED DESCRIPTION

The following is a detailed description of an embodiment of the invention. The disclosed details are merely illustrative of one of the many forms which the invention may take in practise. The invention and novelty reside in neither the hardware nor the software taken separately, but rather in the novel combination of both.

Figure 1:
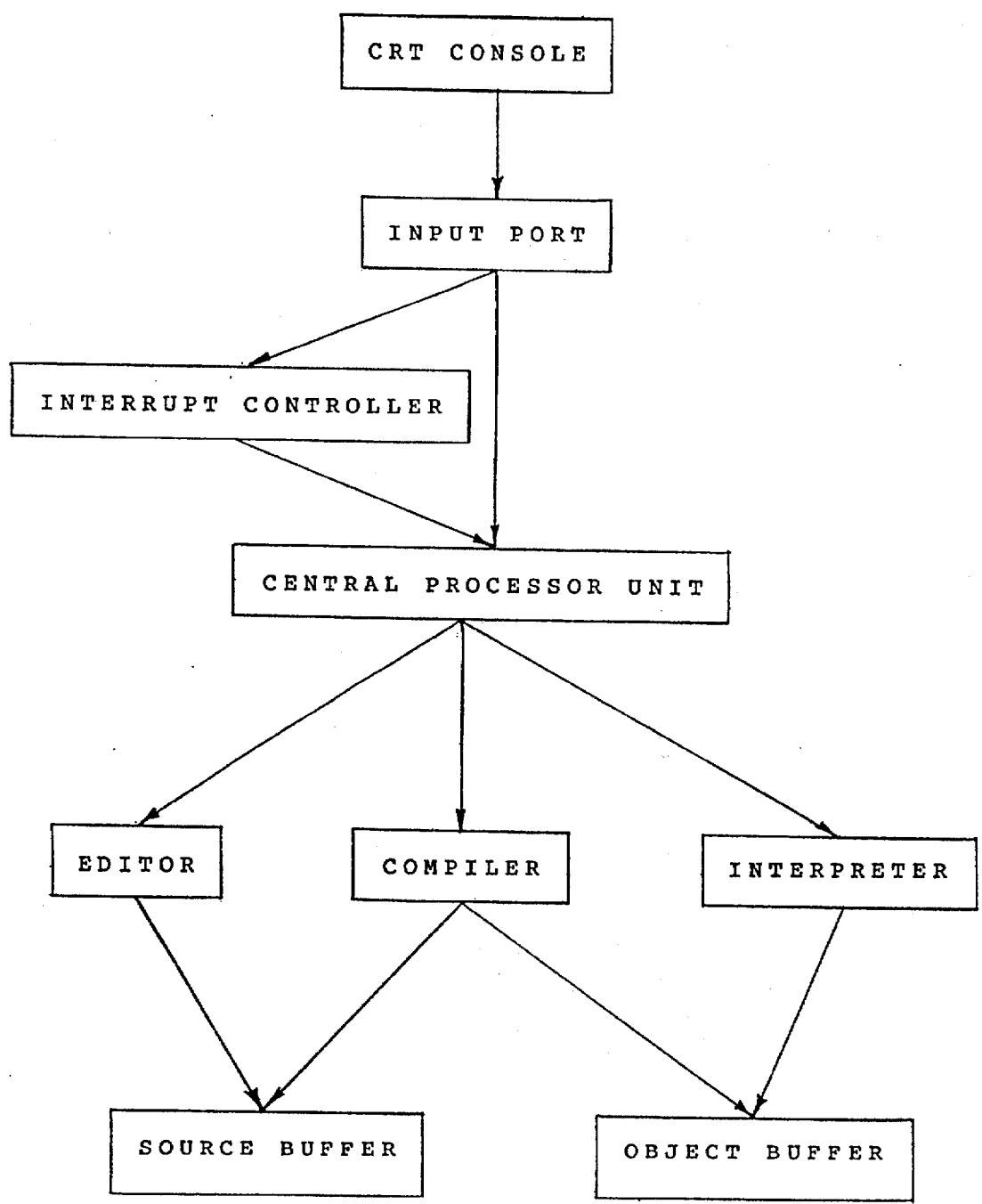
FIG. 1 is a schematic diagram showing the relation of the major hardware components constituting another embodiment of the computer system in accordance with the present invention.

Referring first to FIG. 1 and to FIG. 1a (except for the clock-activated interrupt modification to be described later below), there are shown the major hardware components constituting the overall system an embodiment of the present invention. Each component will be referred to by the legend shown in the respective rectangle of the drawing.

The CRT CONSOLE refers to any suitable terminal having a keyboard for entry of the source code to be compiled and also for entry of editing commands to change the code. The terminal also comprises a video display for implementation of a screen editor. The keyboard is preferably integral with the video display to form a unitary console having an RS-232-C serial link to the remainder of the system.

This serial link is connected to the INPUT PORT which is preferably embodied as a UART (univeral asynchronous receiver transmitter) such as, for example, the 1602, AY-5-1013, or TMS 5501. Each keystroke on the keyboard of the CRT CONSOLE results in the serial transmission to the UART of a train of bits constituting the ASCII byte corresponding to the struck key. The UART reforms the bits into that byte which is then transmitted in parallel on the data bus to the accumulator of the CPU (central processor unit). The UART also provides an output port. Execution of an OUT command by the CPU results in the transmission on the data bus of a byte from the accumulator to the UART which may then serially transmit the byte to the CRT CONSOLE for display on the video screen.

In the usual operating mode of a conventional microcomputer system the status of the input port is repeatedly tested by the central processor unit in a polling loop until the input port status indicates that a byte of data has been received and is available in the UART received data register. The present invention employs instead an interrupt mode of operation whereby the CPU normally executes the compiler until the UART receives a byte from the CRT CONSOLE. The compiler is stored in an area of main memory designated in FIG. 1 as COMPILER.

The data available line of the UART is then activated and this in turn activates the INTERRUPT CONTROLLER to cause the CPU to execute the editor. The latter is stored in an area of main memory designated in the drawing as EDITOR. Upon entry of the received character into the SOURCE BUFFER in main memory, or upon completion of an editing command, a RET (return) instruction is executed by the CPU to cause it to resume its execution of the COMPILER from the point where it was interrupted.

As the COMPILER is executed it preferably performs lexical, syntactic and semantic analyses of the program source code stored in the SOURCE BUFFER. In the preferred embodiment the COMPILER also emits object code and stores it in the OBJECT BUFFER. Upon completion of entry and compilation of the source code program, control of the CPU may be passed to the INTERPRETER for execution of the object code if the latter is in the form of intermediate code. The programmer may be given the option of saving the source code and/or object code in secondary storage such as disk or tape media. Instead of generating intermediate code ("p-code") for interpretation, the compiler may be of the type that emits executable machine code. The COMPILER may require only a single pass through the source code, in the manner of the usual recursive descent Pascal compiler. If the COMPILER requires more than one pass the first pass should preferably perform the syntax analysis so as to reveal all syntax errors.

The interrupt facility enables the programmer to stop execution of the machine code program at any time, examine the values of the variables, and then continue execution. No additional hardware is required for this extra function, and the extra software is minimal.

Figure 2:
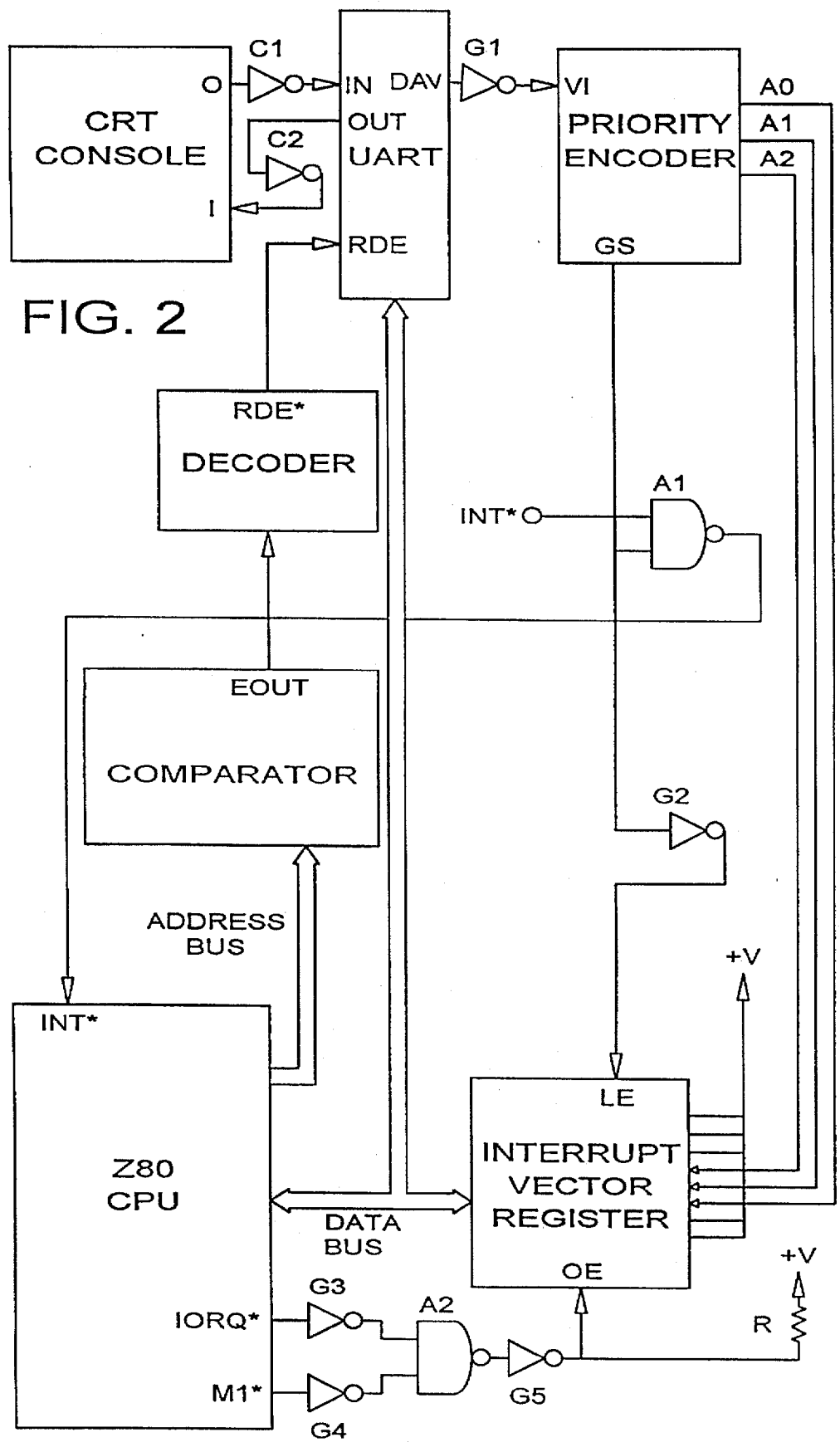
FIG. 2 is a diagram showing the interrupt logic and circuitry of another embodiment of the system hardware.

Referring now to FIG. 2 and to FIG. 2a (except for the clock-activated interrupt modification to be described later below), there are shown the circuitry and hardware components directly involved in the interrupt operation. Upon striking a key of the CRT CONSOLE a train of pulses constituting the byte corresponding to the struck key is emitted from the RS-232-C serial port O. A converter gate C1 converts the pulse train from RS-232-C levels to TTL (transistor-transistor-logic) levels to match the requirements of input port IN of the UART. The latter forms the serial pulse train into an eight-bit byte which is stored in the received data register of the UART. The latter then outputs a data available signal at pin DAV which signal is transmitted by gate G1 to a vectored interrupt input VI of the PRIORITY ENCODER.

Although only one input pin VI of the latter is shown, it will be understood that this chip has other vectored interrupt input pins to which other interrupting devices may be connected. The PRIORITY ENCODER arbitrates competing interrupt requests at its inputs and determines the request having the highest priority. The enable input EI of the PRIORITY ENCODER is grounded as shown.

Assuming that the interrupt request from the CONSOLE and the UART win the priority contest, the ENCODER then transmits a three-bit code A0,A1,A2 to the respective inputs of the INTERRUPT VECTOR REGISTER. The other five inputs of the latter are held positive by potential source +V, so that the resulting byte input to this register chip constitutes an RST call instruction. The signal at output pin GS of the PRIORITY ENCODER is transmitted by gate G2 to the latch enable input LE of the INTERRUPT VECTOR REGISTER to cause the latter to latch the RST call instruction into its internal flip-flops.

Activation of output pin GS of the PRIORITY ENCODER also transmits an interrupt signal through AND gate A1 to the interrupt request pin INT* of the Z80 CPU. Assuming that the interrupt of the processor is enabled, upon completion of the present instruction the CPU's status pins IORQ* and M1* are activated and their signals are transmitted by gates G3,G4 to AND gate A2 to form the INTA (interrupt acknowledge) signal. The latter is inverted by gate G5 and fed to the output enable pin OE of the INTERRUPT VECTOR REGISTER, whereupon the RST call instruction at the inputs of the latter is jammed onto the DATA BUS.

The RST instruction is then input to and executed by the Z80 CPU, causing the latter to push the contents of the program counter onto the stack, and further causing the CPU to jump to a predetermined location in low memory. This location stores a "vector" or three-byte JMP (jump) instruction to an interrupt service routine. The latter includes the editor as well as a subroutine to store the contents of the CPU registers. Control of the CPU is then retained by the editor until either a character has been entered into the source code buffer or an editing operation has been completed.

The editor includes an input instruction which when executed causes the CPU to place the address of the UART's port on the ADDRESS BUS. This address is tested by the COMPARATOR, and if it matches that of the port, the output pin EOUT is activated to signal the DECODER. The latter is controlled by other control and status signals (not shown) in the conventional manner so as to transmit a signal RDE* to the corresponding input RDE of the UART. The byte in the received data register (not shown) of the UART is then gated onto the DATA BUS and transmitted to the accumulator within the CPU.

In the preferred embodiment of the invention shown in FIG. 2 the integrated circuits may be implemented as follows:

UART: 1602
PRIORITY ENCODER: 74LS148
INTERRUPT VECTOR REGISTER: 74LS373
DECODER: 74LS155

COMPARATOR: 25LS2521
C1: 1489
C2: 1488

Figure 3:
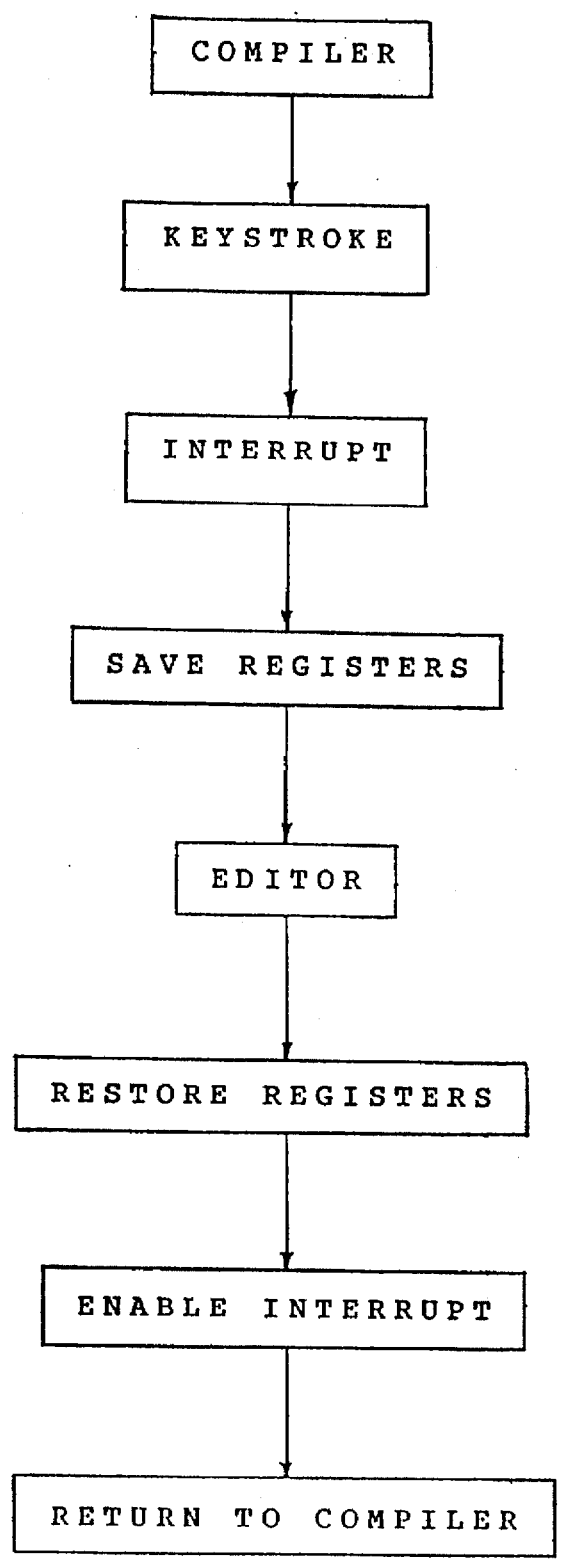
FIG. 3 is a flowchart showing the sequence of operations of another embodiment of the illustrative compiler implementation.

Referring now to FIG. 3 and to FIG. 3a (except for the clock-activated interrupt modification to be described later below) there is shown the sequence of operations of the overall system. The COMPILER normally has control of the CPU and either is in an infinite loop upon reaching a Pause Mark in the source code buffer or is in the process of analysing the source code in the buffer.

The occurrence of a KEYSTROKE at the terminal causes an INTERRUPT, whereupon the CPU is vectored to the interrupt service routine. The latter includes a subroutine to perform the SAVE REGISTERS procedure shown in the drawing.

The EDITOR is then executed by the CPU. If the KEYSTROKE corresponds to a control character, then an editing procedure such as a cursor movement, screen scroll, character deletion, or line deletion is performed. If the KEYSTROKE corresponds to an alphanumeric character or other valid source code character the latter is entered into the source code buffer and displayed on the video screen, and the screen cursor is advanced to the next character position.

The interrupt service routine then jumps to its subroutine to perform the RESTORE REGISTERS procedure whereby the registers of the CPU are restored to their original values at the instant of the interrupt.

The ENABLE INTERRUPT instruction (EI) is then executed by the CPU so that the latter may respond to the next interrupt. Finally the RET instruction is executed so that the CPU may RETURN TO COMPILER. The compiler then resumes execution from the point where it was interrupted.

Figure 4:
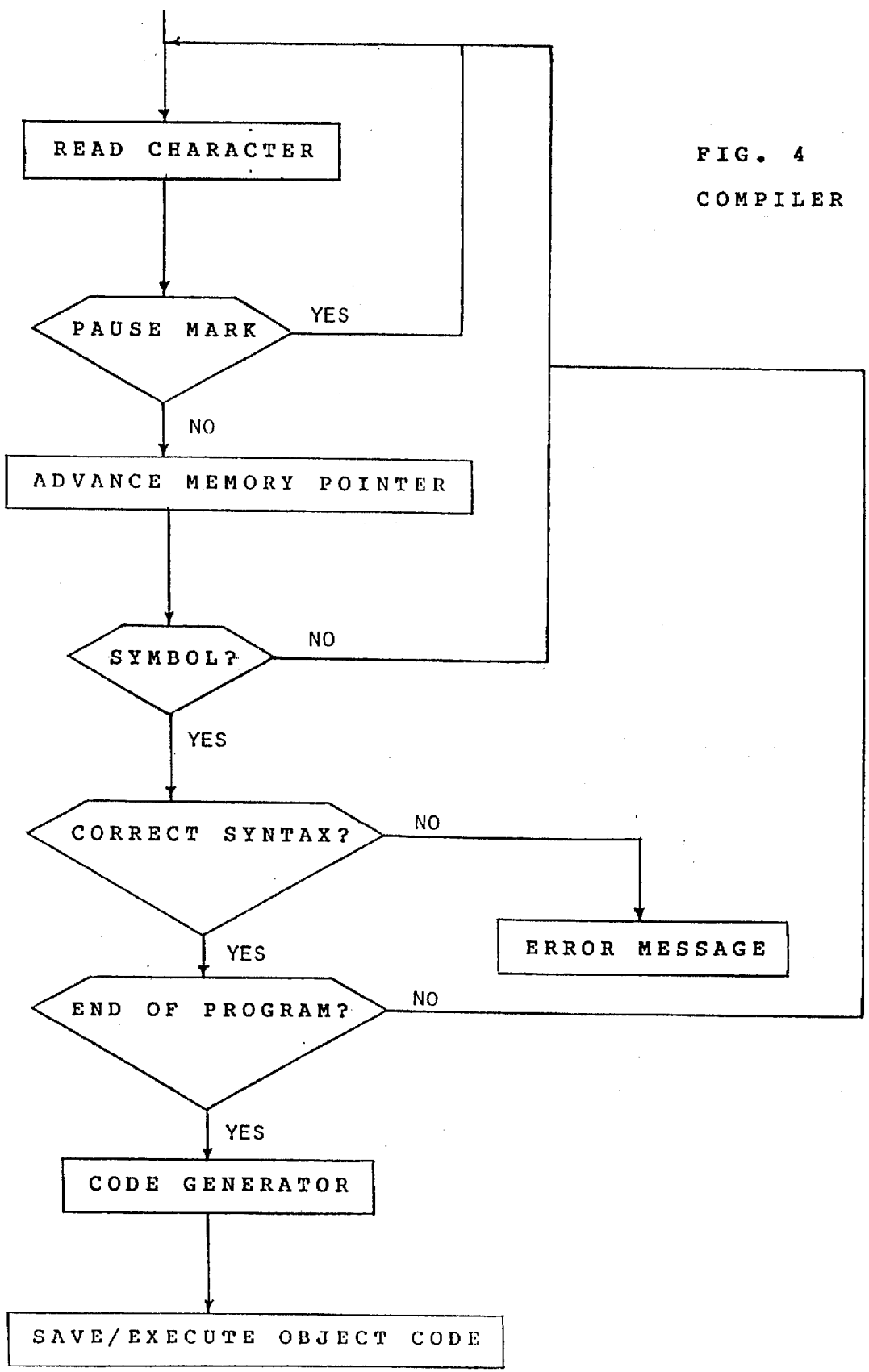
FIG. 4 is a flowchart showing the sequence of operations of the compiler thread.

Referring now to FIG. 4, there is shown the sequence of operations of the compiler. After initialization, the compiler first performs its READ CHARACTER function whereby the byte in the first location of the source code buffer is read.

If this byte is the predetermined code designated as the Pause Mark the compiler pointer does not advance and the compiler enters an infinite loop wherein it continues to read the same location until the content of this location is changed by the editor to a blank. When this change occurs the compiler memory pointer is incremented to the next location of the buffer so that the compiler exits from its Pause loop, as indicated by the legend ADVANCE MEMORY POINTER.

As indicated by SYMBOL?, the lexical analyser of the compiler then determines if the source character read in constitutes the last character of a symbol, such as an identifier, operator or punctuation mark. If not, the READ CHARACTER function is executed again until a symbol is recognized.

The syntax analyser of the compiler then determines if this symbol conforms to CORRECT SYNTAX in accordance with the grammar of the programming language. If the symbol does not conform to the syntax an ERROR MESSAGE is displayed.

If the syntax is correct, the READ CHARACTER function is repeated until an error is found or the END OF PROGRAM is reached. In this event the CODE GENERATOR may be invoked if this function is performed as a separate pass. Alternatively, code generation may be performed concurrently with the lexical and syntactical analyses. The generated code may then be saved on disk and/or executed, at the option of the programmer, as indicated by the legend SAVE/EXECUTE OBJECT CODE.

For clarity in illustration it will be shown how the simple and widely-published compiler PL/0 of Prof. N. Wirth ("Algorithms+Data Structures=Programs", Ch. 5, pp. 280–347, 1976, Prentice-Hall, Inc.) may be modified for implementation in the present invention. In the description below the following identifiers have been added and do not appear in the original PL/0 compiler as published: CONT, PEEK, RECOMPILE, PTR, PM and SP.

The first statement in the modified compiler is:

IF NOT CONT THEN

The boolean variable CONT is FALSE upon initial entry into the compiler signifying that this is not a continuation of a previous execution. That is, the compiler has just been entered for the first time during the present session. The subsequent assignment statements are therefore executed to initialize the contents of the arrays WORD, WSYM, SSYM, MNEMONIC, DECLBEGSYS, STATBEGSYS and FACBEGSYS shown at Pages 346, 347 of the Wirth treatise, supra. The values of these arrays remain fixed throughout execution of the compiler and the above conditional IF statement obviates the need to re-execute all of these assignment statements upon subsequent re-initializations of the compiler for recompilations. That is, after the first test of the variable CONT it is set equal to TRUE so as to bypass the assignment statements thereafter when recompilation is required.

After the conditional block of array assignments a PEEK assembly language function is invoked to read the content of the memory location immediately preceding the start of the source code buffer, in which location is stored the recompile flag. If this location has had the ASCII code for the letter 'R' stored therein by the editor then a compiler procedure RECOMPILE is invoked to reinitialize the variables ERR, CC, CX and LL, and to assign the value of constant AL (10) to the variable KK.

The RECOMPILE procedure also sets the value of a pointer variable PTR equal to the address of the beginning of the source code buffer. The pointer PTR is the memory pointer of the compiler's lexical analyser and is successively advanced from byte to byte of the source code to read the latter. The lexical analyser reads in the byte in the memory location pointed to by the pointer PTR.

The lexical analyser embodies another major change in the PL/0 compiler. It is embodied in the procedure GETSYM which also has nested therein the procedure GETCH.

GETSYM has as its first statement:

WHILE CH=' ' DO GETCH;

This constitutes part of an infinite loop which repeats for as long as the procedure GETCH returns the ASCII code (32) for a space. As explained below, the procedure GETCH will return the space code 32 whenever it reads the Pause Mark.

GETCH has as its first statement:

CH:=PTR^;

so as to read into the variable CH the contents of the source memory location pointed to by the pointer variable PTR. The next statement of GETCH is:

IF CH=CHR(PM) THEN thereby testing if the byte read is the Pause Mark PM which is a constant equal to 35. This value was chosen because it is a visible character and was otherwise unused.

Following the IF clause is the assignment:

CH:=CHR(SP)

where SP is equal to the ASCII code (32) for a space. Control then returns to GETSYM where the condition of the WHILE clause is satisfied so that it again invokes GETCH. This sequence is repeated and results in an infinite loop for as long as the byte in the memory location being read is the Pause Mark.

After the editor changes that byte from the Pause Mark to the ASCII code for a space the loop will be broken because the boolean condition of the IF clause will no longer be satisfied (variable CH will no longer equal PM). Instead the following ELSE clause will be executed so as to advance the source memory pointer PTR to the next memory location by the statement:

PTR:=PTR+1;

whereafter the next invocation of GETCH will read the next source memory locaton to enable the compiler to continue its advance through the source code. The pointer PTR is repeatedly advanced with each successive call of GETCH until it reaches the new Pause Mark inserted by the editor, as described below.

Figure 5:
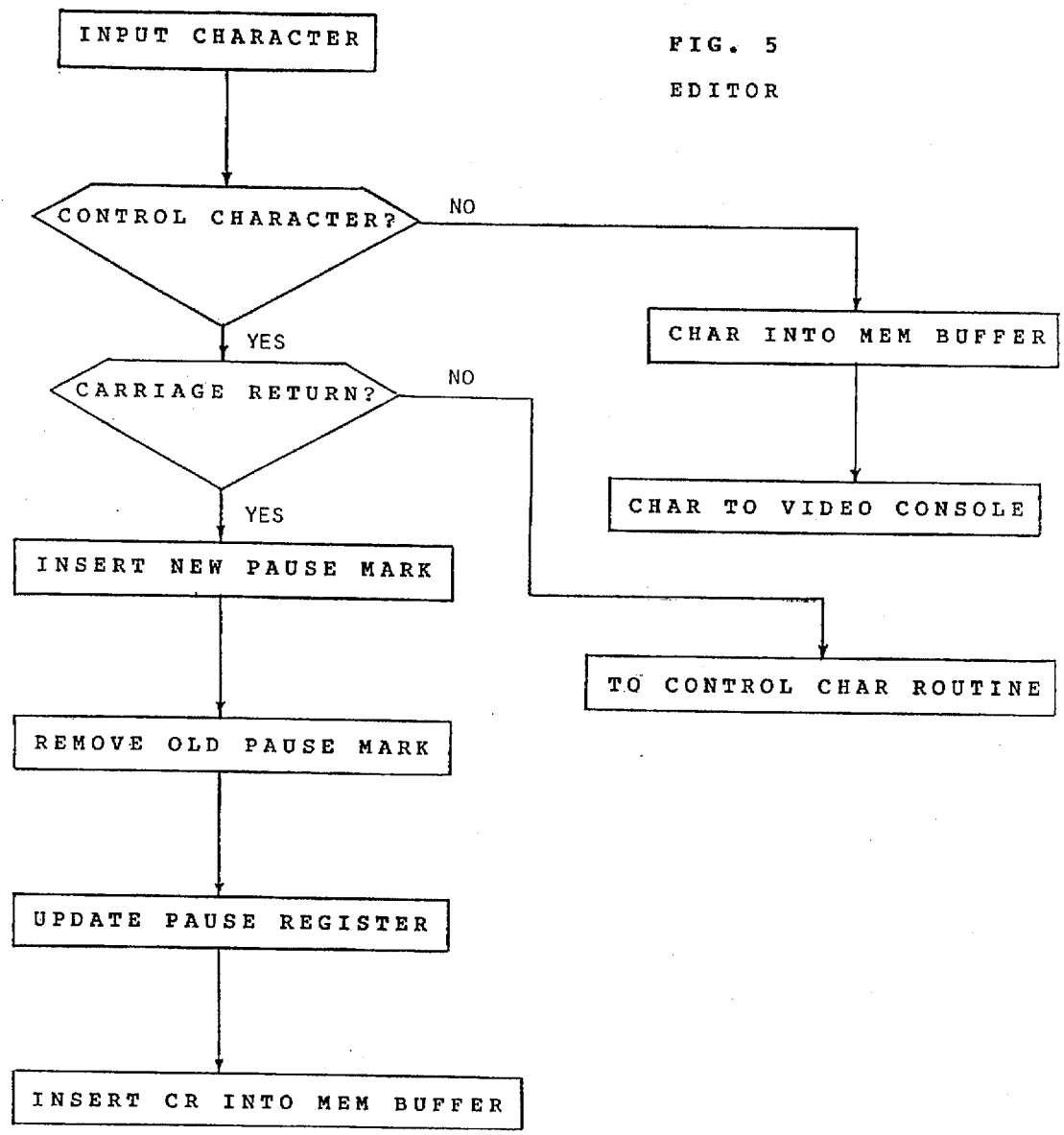
FIG. 5 is a flowchart showing the sequence of operations of the editor thread.

Referring to FIG. 5, there is shown the sequence of operations of the editor. The INPUT CHARACTER function is first performed in response to the KEYSTROKE (FIG. 3). The editor then determines if the input byte is a CONTROL CHARACTER. If not, the character is entered into the source code buffer as indicated at CHAR INTO MEM BUFFER. The input character is also displayed on the screen as indicated at CHAR TO VIDEO CONSOLE. If the input character is a control character, the editor then determines if it Ks a CARRIAGE RETURN? If not, the appropriate one of the editor's routines for handling control characters is called, as indicated by the legend TO CONTROL CHAR ROUTINE, and as described below with reference to FIG. 6.

Still referring to FIG. 5, if the input character is a carriage return then a new Pause Mark is written into the source code buffer adjacent the end of the current line, as indicated at INSERT NEW PAUSE MARK. The old Pause Mark is changed to a blank (space), as indicated by the legend REMOVE OLD PAUSE MARK.

For convenience in finding the location of the Pause Mark subsequently, a memory word location is reserved as a Pause Register for storage of the location address of the Pause Mark. The address of the new Pause Mark is thus stored in this memory register, as indicated by the legend UPDATE PAUSE REGISTER. The ASCII code for a carriage return (13) is then entered into the source code buffer adjacent the Pause Mark, as indicated by INSERT CR INTO MEM BUFFER. The ASCII code for a line feed (10) may be entered after the carriage return if this convention is desired.

Referring now to FIG. 6, there is shown the sequence of operations of the editor routines for handling control characters input at the console. The input character is first tested to determine if it is the code for the CURSOR UP operation. If not, it is then tested to determine if it is the code for the SCREEN UP operation. If not, the input control character is handled in a conventional manner which will not be further described, as indicated by the legend PROCESS OTHER CONTROL CHAR.

If the input control character is the code for the CURSOR UP or SCREEN UP then the respective operation MOVE CURSOR UP or SCROLL SCREEN is performed. In the former case the cursor is moved up one line on the video screen. In the latter case the screen is erased and is rewritten to display those lines of the source code buffer immediately preceding the erased lines.

As indicated at INSERT NEW PAUSE MARK, a new Pause Mark is inserted adjacent the end of the source code buffer line immediately preceding the line now bearing the new cursor position. The operations REMOVE OLD PAUSE MARK and UPDATE PAUSE REGISTER are then performed in the same manner as described above with respect to FIG. 5.

The operation SET RECOMPILE FLAG causes reinitialization of the compiler when the latter resumes control of the CPU after return from the interrupt service routine. This flag is preferably a memory location wherein a predetermined code may be stored to inform the compiler that recompilation of the source code is required.

In the preferred embodiment this recompile flag is set to require recompilation whenever the cursor is moved up or the screen frame is scrolled up. That is, it is assumed that whenever the cursor is moved to point to source code which may have already been compiled that this code will be changed so as to require recompilation.

An alternative method would be to set the recompile flag only if the previously compiled code is actually changed, since it is possible that the programmer may scroll the screen up and then scroll down again without making any change in the source code.

Another alternative would be to maintain a memory register holding the address of the latest position of the compiler pointer. The editor might then compare this address with that of the source location pointed to by the cursor to determine if the editing changes are being made to source code which has already been compiled.

Although these alternative schemes result in fewer recompilations, the preferred embodiment has the advantage of simpler implementation. Furthermore, the compilation process is so much faster than the manual typing of source code at the console that the compiler will recompile all but the largest programs and catch up with the programmer before the programmer can type more than a few new lines of code. Therefore the reduction of the number of recompilations to the absolute minimum is not essential.

The editor is written in Pascal with calls to sixteen external assembly language procedures and functions. Those routines unique to the present invention will now be described.

Upon entry to the editor the boolean variable ECONT is tested to determine if this invocation of the editor is the first entry of the present session or a continuation. If ECONT is FALSE then it is-set equal to TRUE and the following procedures are called: INIT, NEWFILE, VECTOR and TOPLO.

The procedure INIT clears the source code buffer, sets the memory pointer to the start of the buffer, inserts the Pause Mark at the first location of the buffer, sets the contents of the Pause Register to the address of this first location, initializes the cursor to the first row and first column of the screen, and sets the recompile flag pointer to the memory location preceding the first byte of the buffer.

The procedure NEWFILE prompts the programmer to select either a new file for entry of source code or an old file for editing. If the latter, the file is read into the source code buffer from a disk and the first screen of source code is displayed.

The procedure VECTOR calls the external assembly procedure POKE three times to store in low memory (20 H)

the jump vector to a subroutine SAVREGS which stores the contents of the CPU registers. In response to an interrupt activated by a keystroke at the console the CPU executes the RST4 call instruction and executes this jump vector and then the SAVREGS subroutine. After the registers are saved a jump instruction in the subroutine sends the CPU to the editor.

The TOPLO procedure passes control to the PL/O compiler. It is usually called after the editor has completed the character entry or editing function corresponding to the key struck at the terminal. In this case the procedure is called after initialization of the editor.

The next statement of the editor is not reached until an interrupt occurs in response to a keystroke. This statement reads into a variable the ASCII code input from the UART's received data register. This input byte is tested to determine if it is a control character or alphanumeric character (greater than 31). If the latter it is entered into the source code buffer and displayed on the video screen in the conventional manner.

If the input byte is either the control code for moving the cursor down or for scrolling the screen frame down, the appropriate procedure is called and concludes with an invocation of the procedure UPDATE. The latter enters into the source buffer a new Pause Mark adjacent the end of the old line in the case of a cursor down operation, and adjacent the end of the invisible line preceding the first displayed line in the case of a scroll down operation. The procedure UPDATE also removes the old Pause Mark by substituting the ASCII code for a space (32) in place of the Pause Mark in the old location of the latter. The Pause Register is also updated to the address of the new Pause Mark location.

If the input byte is either the control code for moving the cursor up or for scrolling the screen frame up toward the beginning of the source, the corresponding procedure is called to perform the respective operation. This procedure concludes with invocations of the previously described procedure UPDATE and also the procedure RECOMPILE. The latter stores the ASCII code for the letter 'R' in the memory location immediately preceding the start of the source code buffer so as to constitute the recompile flag noted above. Upon completion of the cursor up operation or the screen scroll up operation the CPU will return to the compiler which will test the recompile flag, determine that the flag is set, and then call its reinitialization procedure to force the compiler to recompile the source code from the beginning of the source buffer.

If the input byte is the ASCII code for a carriage return (13) the procedure CRET is called. This routine enters into the source buffer a new Pause Mark adjacent the carriage return code, removes the old Pause Mark, and updates the Pause Register, among other more conventional functions such as adding a line feed code to the buffer, updating the cursor, and scrolling the video display if the present line is the last line of the screen.

It should be understood that the preferred embodiment described above and shown in the drawings is merely illustrative of one of the many forms which the invention may take in practise, and that numerous modifications thereof may be made by those skilled in the art without departing from the scope of the invention as defined in the appended claims.

For example, instead of the Pause Mark implemented as a predetermined code entered into a memory location within the source code buffer, the pause location may be defined for the compiler by a memory address stored in a register. The compiler may then be prevented from analysing code stored in memory locations beyond this address which may be incremented and decremented by the editor.

Figure 1A:
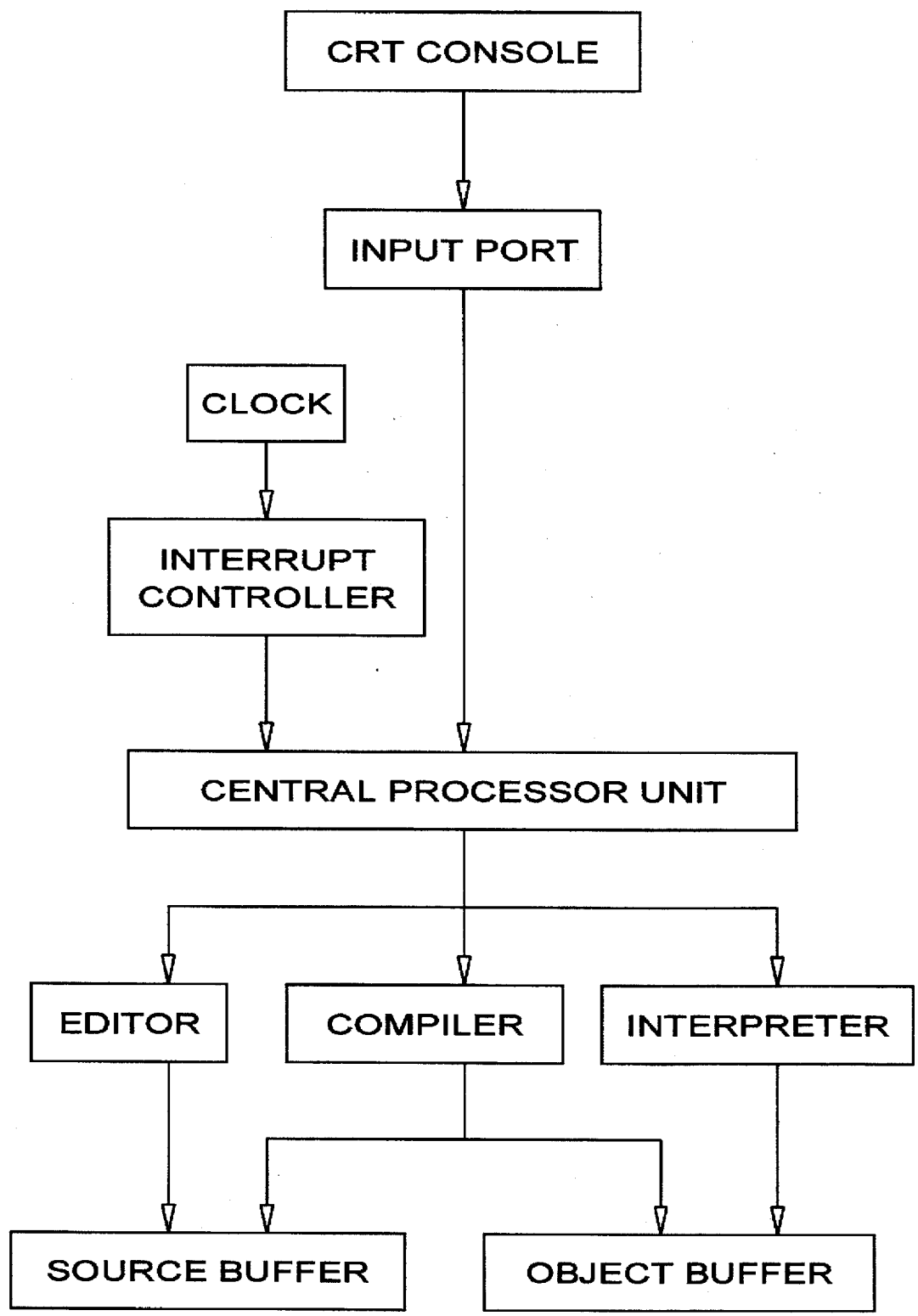
FIG. 1a is a schematic diagram showing the relation of the major hardware components constituting the preferred clock-activated-interrupt embodiment of the computer system in accordance with the present invention.
Figure 2A:
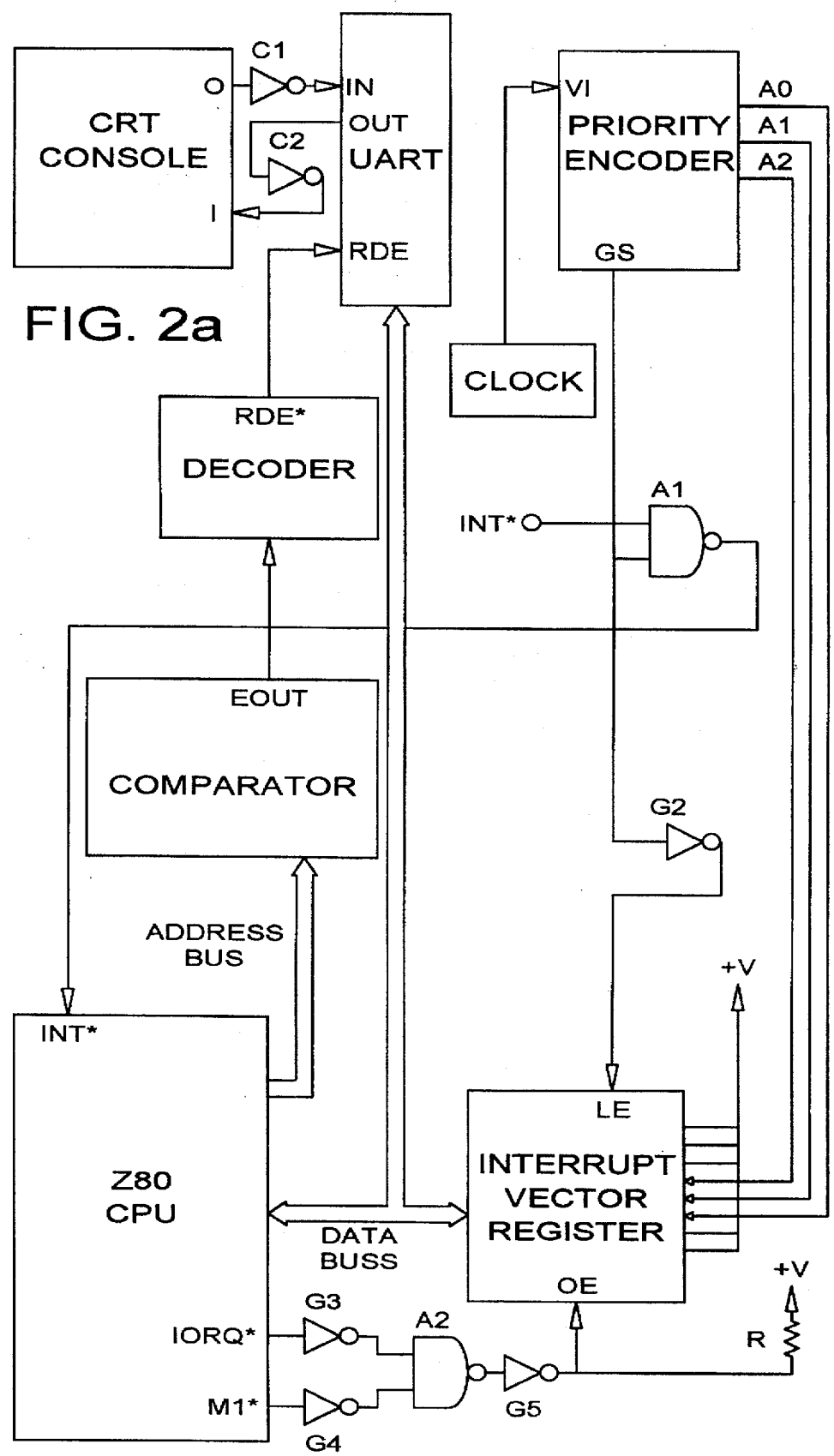
FIG. 2a is a diagram showing the interrupt logic and circuitry of the system hardware of said preferred embodiment.
Figure 3A:
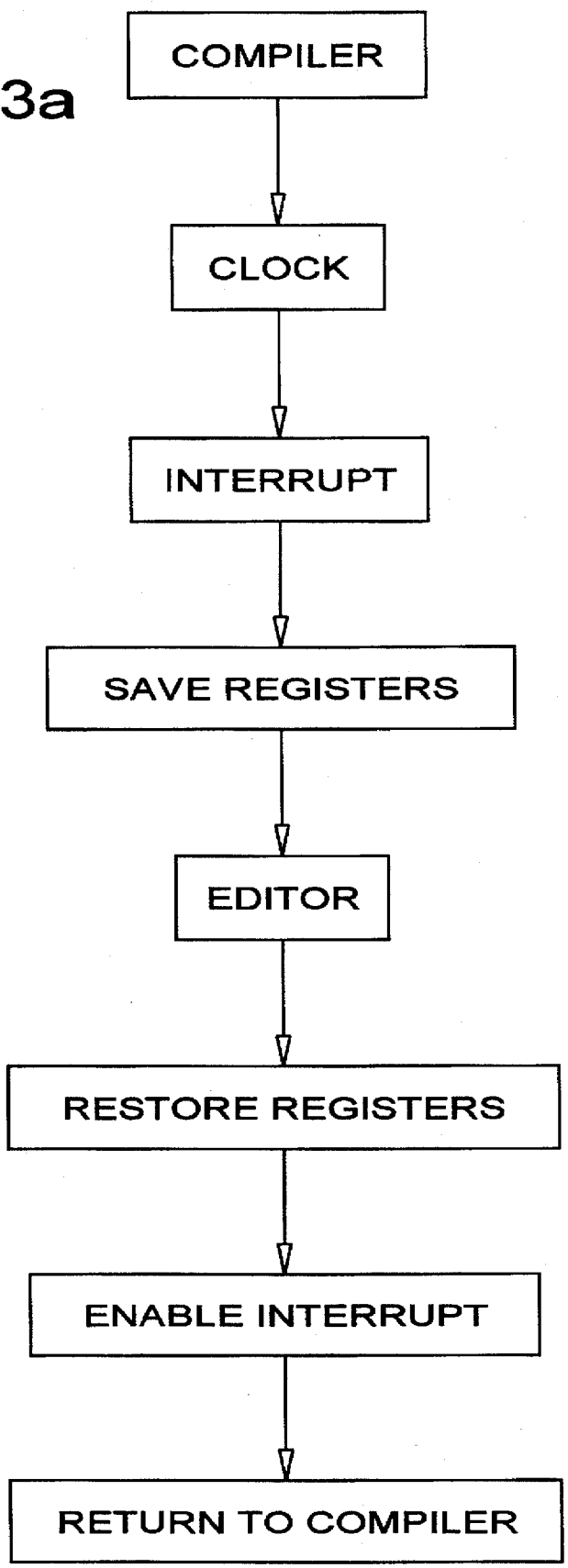
FIG. 3a is a flowchart showing the sequence of operations of the illustrative compiler implementation of said preferred embodiment.

Furthermore, the interrupt which causes control of the CPU to pass from the compiler to the editor may be activated by a timer or clock instead of by the keyboard, as shown in FIGS. 1a, 2a and 3a. That is, the compiler may be periodically interrupted and the input port polled to test if a key has been struck. If not, the interrupt is terminated and control returns to the compiler. If polling the port reveals that a key has been struck then the interrupt service routine editor takes control and is executed in the manner described above. For most applications clock interrupts at intervals of about every 10 to 30 milliseconds should be frequent enough to keep up with keys stroked at the keyboard.

Furthermore, the recompile flag may be set whenever the compiler determines that the source code contains an error. That is, it may be assumed that whenever an error is revealed the source code will be changed so as to require recompilation.

Another possible modification is to eliminate the requirement of recompilation from the very beginning of the source code in those instances where the error occurs in the last completed line of source code. During the compilation of the line the resulting register values, table entries, stack manipulations, variable assignments and code buffer entries are temporarily stored and are not finally entered until the syntax analysis of the source line is completed and determines that the line conforms to the grammar. If the line contains an error these temporary entries are discarded and the compiler pointer is moved back to the end of the previous line, thereby obviating recompilation. However, this scheme will still require recompilation if source lines previous to the last line are modified.

Still another possibility would be to have the editor advance the Pause Mark after entry of each character or after entry of each delimited symbol. This would have the advantage of revealing an error almost instantly upon its entry at the keyboard, instead of waiting until completion of the current line. The disadvantage would be that recompilation would be required for every minor typing error without giving the programmer a chance to correct it before it is scanned and parsed.

I claim:

1. A method of preemptive multithreaded operation of a computer including a clock and a central processing unit having an interrupt operation so as to provide for the execution of a program having a task comprising a plurality of subtasks each performed concurrently by a respective one of a plurality of instruction threads of said program, said method comprising periodically actuating said interrupt operation in response to said clock at predetermined time intervals to provide a plurality of series of spaced timeslices with a respective series of said plurality of series allocated for the execution of each thread and with the timeslices of each series of timeslices of said plurality of series interleaved with the timeslices of at least one other series of said plurality of series, preempting an executing thread of said program in response to each actuation of said interrupt operation so as to terminate the timeslice of execution of said executing thread and to take control of the central processing unit away from said executing thread after the latter has executed only a portion of its respective subtask, passing said control of the central processing unit to another thread of said same program and thereby invoking said another thread to perform a next successive portion of the respective subtask of said another thread during the next successive timeslice of the respective series of timeslices of said another thread, thereafter returning control of the central processing unit to a previously preempted thread of said same program to enable said previously preempted thread to perform the next successive portion of its respective subtask during the next timeslice of its respective series of spaced timeslices, and repeating the above-recited cycle of said clock responsive actuation of the interrupt operation, said thread preemption and said thread invocation, until the respective subtasks of the threads of said program are completed, whereby each subtask portion is executed during a respective timeslice with the subtask portions of one thread interleaved with the subtask portions of at least one other thread to provide concurrent and effectively simultaneous execution of the threads.

2. A method as recited in claim 1 and comprising manually interactively controlling the execution of one of said program threads while said thread executes in the foreground, displaying to an operator the effects of said manual control, whereby said one thread executes interactively in the foreground while another thread of the same program executes in the background concurrently with the execution of the foreground thread, and switching control of the central processing unit repeatedly between the foreground and background threads so rapidly that an interactive operator perceives the foreground and background threads to be executing simultaneously.

3. A method as set forth in claim 1 and comprising the step of passing control of the central processing unit from an executing thread to another thread before the end of the timeslice of the executing thread whenever the executing thread has completed said portion of its subtask before said end of said timeslice.

4. A method for operator-interactive preemptive concurrent multithreading execution of a plurality of instruction threads located within the same software program in a personal microcomputer system including a microprocessor having an interrupt input and clock driven means for periodically activating said interrupt input at brief predetermined intervals, said method comprising interrupting the execution of an executing instruction thread and preemptively taking control of the microprocessor away from said executing instruction thread in response to each said activation of said interrupt input, passing control of the microprocessor to another of said threads of said software program for execution of said another thread, thereafter returning control of the microprocessor to said interrupted thread to enable the latter to resume execution, at the point where said thread had been interrupted, until the next activation of said interrupt input by said clock driven means, actuating operator responsive means and thereby interactively controlling the execution of at least one of said program threads during the execution of said one thread, interactively displaying to an operator in real time the effects of said operator actuated control, whereby a thread of a program may execute interactively with the operator in the foreground while another thread of the same program executes in the background concurrently with the interactive execution of the foreground thread, and switching control of the microprocessor repeatedly back and forth between the foreground and background threads so rapidly that an interactive operator perceives the foreground and background threads to be executing simultaneously.

5. A method as recited in claim 4 wherein each of said threads has a respective task to execute, the further steps comprising providing in response to said clock driven means activating said interrupt input a respective series of spaced timeslices of execution for each thread with the timeslices of each series interleaved with the timeslices of at least one other series, preemptively taking control of the microprocessor from an executing thread at the end of its timeslice after the executing thread has executed only a portion of its task, passing control of the microprocessor to another thread to execute the next successive portion of the task of said another thread during the next successive timeslice of the respective series of timeslices of said another thread, and thereby executing the task of each thread piecewise with the successive executed task portions of each thread interleaved with the successive executed task portions of at least one other thread.

6. A method for preemptive multithreaded execution of a plurality of instruction threads located within the same multithreaded software program in a general-purpose computer system including a central processor having an interrupt operation and a clock timer for periodically activating said interrupt operation at brief predetermined time-sliced intervals, said method comprising interrupting the execution of an executing thread and taking therefrom control of the central processor upon each said activation of said interrupt operation, passing control of the central processor to another of said threads of said multithreaded software program for execution of said another thread, thereafter returning control of the central processor to said interrupted thread, and repeating the above-recited cycle of steps to switch control of the central processor from one thread to another thread and back again iteratively and rapidly so that the threads effectively execute simultaneously.

7. In a multithreading computer system as recited in claim 6 wherein said program has a task comprising a plurality of subtasks each executable by a respective one of said threads, the further steps comprising providing for the execution of each thread a respective series of said spaced time-sliced intervals with the time-sliced intervals of each series interleaved with the time-sliced intervals of at least one other series, and repeatedly preemptively taking control of the central processor from at least one executing thread at the end of its time-sliced interval after the executing thread has performed only a portion of its respective subtask.

8. In a method as recited in claim 6 wherein said program has a task to be performed, said task comprising a plurality of subtasks each executable by a respective one of said threads, the further steps comprising providing in response to said clock timer activating said interrupt operation a respective series of spaced time-sliced intervals for the execution of each thread with the intervals of each series interleaved with the intervals of at least one other series, preemptively taking control of the central processor from an executing thread at the end of its then current time-sliced interval at which time the executing thread has performed only a portion of its subtask, passing control of the central processor to another thread to perform a next successive portion of the subtask of said another thread during a next successive time-sliced interval of the respective series of time-sliced intervals of said another thread, and thereby performing the subtask of each thread piecewise with the successive portions of each thread subtask interleaved with the successive portions of at least one other thread subtask.

9. A method as recited in claim 6 and comprising manually interactively controlling the execution of one of said program threads, and displaying to an operator the effects of said manual control, whereby a thread of a program may execute interactively with the operator in the foreground while another thread of the same program executes in the background concurrently with the execution of the foreground thread, and switching control of the central processor repeatedly between the foreground and background threads so rapidly that an interactive operator perceives the foreground and background threads to be executing simultaneously.

10. A multithreading software-programmable general-purpose computer system for concurrent processing of the same body of data code by at least two concurrently executing instruction threads constituting a single program, said computer system comprising:

a central processing unit having an interrupt input, a memory, means for entry into said memory of a body of data code to be processed, means for operator selection and entry into said memory of a program comprising at least two concurrently executable instruction threads for processing said body of data code, means to cause the central processing unit to execute a first of said entered threads under control of said first thread to process the previously entered body of data code in accordance with a first mode of processing, clock means to repeatedly activate said interrupt input so as to interrupt execution of said first thread and preemptively switch control of the central processing unit to another of said entered threads for execution of said another thread so as to process the same previously entered body of data code in accordance with a second mode of processing, and means activated after each said interrupt input activation and its respective second mode of processing by said another thread to return control of the central processing unit to said first thread to enable said first thread to resume said first mode of processing said body of data code at the point in the code where the first thread had been interrupted.

11. A multithreading computer system as recited in claim 10 and comprising operator actuated means for interacting with the execution of one of said program threads, and display means for interactively showing to an operator in the foreground the effects of said operator actuated interaction while concurrently therewith another of said threads executes in the background.

12. A multithreading computer system as set forth in claim 11 wherein said operator actuated means comprises manually operable means for transmitting to said central processing unit a set of signals occurring at spaced time instants in a sequence having time intervals between pairs of successive signals, said central processing unit executing said background thread during said time intervals.

13. A multithreading computer system as set forth in claim 11 wherein said user actuated means comprises manually operable means for transmitting to said central processing unit a set of signals occurring at spaced time instants in a sequence having time intervals between pairs of successive signals, said central processing unit executing said background thread during said time intervals.

14. A multithreading software-programmable general-purpose computer system for concurrently executing at least two instruction threads constituting a single program, said computer system comprising:

a central processing unit having an interrupt input, a memory, means for operator selection and entry into said memory of a program comprising at least two concurrently executable instruction threads, means to cause the central processing unit to execute a first of said entered threads under control of said first thread, and clock means to repeatedly activate said interrupt input so as to interrupt execution of said first thread and preemptively switch control of the central processing unit to another of said entered threads for execution of said another thread.

15. A multithreading computer system as set forth in claim 14 wherein said clock means comprises means to periodically activate said interrupt input at predetermined time intervals so that said threads obtain control of the central processing unit during alternate time slices of the running time of the latter.

16. A multithreading computer system as recited in claim 14 wherein said program is a user application program, user actuated means for interacting with the execution of one of said program threads in the foreground, and display means for interactively showing to a user the effects of said user actuated interaction while another of said threads executes concurrently therewith in the background.

17. A multithreading software-programmable general-purpose computer system for concurrent processing and modification of the same body of data code by at least two concurrently executing instruction threads constituting a single program, said computer system comprising:

a central processing unit having an interrupt input, a memory, means for entry into said memory of a body of data code to be processed, means for operator selection and entry into said memory of a program comprising at least two concurrently executable instruction threads for processing said body of data code, a first of said threads including means for processing the previously entered body of data code, and a second of said threads including means for modifying the same previously entered body of data code, means to cause the central processing unit to execute said first thread to process said body of data code, means to repeatedly activate said interrupt input to interrupt the execution of said first thread and preemptively switch control of the central processing unit to said second thread for execution of the latter thread so as to modify said body of data code, and means activated after each said interrupt input activation and its respective modification of the body of data code by said second thread to return control of the central processing unit to said first thread to enable the latter to resume said processing of said body of data code at the point in the code where the first thread had been interrupted, said means to repeatedly activate said interrupt operation comprising clock timer means to periodically activate said interrupt operation at predetermined time intervals so that said threads obtain control of the central processing unit during alternate time slices of the running time of the latter.

18. A preemptive multithreading computer system for the concurrent execution of a plurality of instruction threads of the same program with each thread executing successive incremental portions of its task during successive timeslices of a respective series of spaced timeslices and with the timeslices of execution of each thread alternately interleaved with the timeslices of execution of at least one other thread, said system comprising a memory for storing a program comprising a plurality of sets of instructions with each set executable to provide a respective thread of execution and with each thread having a respective task to perform, central processing means having an interrupt operation, a clock for periodically actuating said interrupt operation at predetermined time intervals, and an interrupt service routine responsive to each said clock actuation of the interrupt operation to preempt an executing thread so as to terminate its timeslice of execution and take control of the central processing means away from said executing thread after the latter has executed only a portion of its task, said interrupt service routine passing said control of the central processing means to another thread thereby to invoke said another thread to perform the next successive portion of its task during the next successive timeslice of the respective series of timeslices of said another thread, whereby the above-recited cycle of clock actuated interrupt, thread preemption and thread invocation, is iterated repeatedly until the respective tasks are completed, and whereby a multithreading mode of operation is provided with said plurality of threads executing concurrently during their respective spaced interleaved timeslices with the successive executed task portions of each thread interleaved with the successive executed task portions of at least one other thread.

19. A multithreading computer system as recited in claim 18 wherein said program is an operator-selectable application program, operator actuated means for selecting said application program and for loading said application program into said memory, operator actuated means for interactively controlling the execution of one of said program threads while said thread executes in the foreground, and display means for interactively showing to an operator the effects of said operator actuated control, whereby a thread of the program may execute interactively with the operator in the foreground while another thread of the same program executes in the background concurrently with the execution of the foreground thread, and said clock and interrupt service routine coacting to switch control of the central processor means repeatedly between the foreground and background threads so rapidly that an interactive operator perceives the foreground and background threads to be executing simultaneously.

20. A multithreading computer system as set forth in claim 18 wherein said memory comprises a plurality of addressable locations, and means for allocating at least a subset of said addressable memory locations and for designating said allocated subset to be the address space accessible by said program, whereby a plurality of threads of said program may each have direct unrestricted access to said program address space.

21. A multithreading computer system as set forth in claim 18 wherein said memory comprises a plurality of addressable locations, and means for allocating at least a subset of said addressable memory locations and for designating said allocated subset to be the address space accessible by said program, whereby a plurality of threads of said program may each have direct access to said program address space, said central processing means comprising a set of registers having values stored therein, means responsive to activation of said interrupt operation to save the values stored in said registers, and means responsive to subsequent return of control of the central processing means to said preempted thread for restoring said saved values back into said registers.

22. A multithreading computer system as recited in claim 18 and comprising said memory including an address space directly accesible by the threads of said program, means for storing code in said address space for concurrent processing of said code by at least two of said program threads, operator actuated means for interacting with the execution of one of said program threads as said one thread processes said stored code in the foreground while another of said threads executes concurrently therewith in the background also to process said stored code, and display means for interactively showing to an operator the effects of said operator actuated interaction.

23. A multithreading computer system as set forth in claim 22 wherein said operator actuated means comprises a keyboard, and said display means comprises a video monitor having a viewing screen, whereby the effects of actuation of the keyboard upon execution of said one thread in the foreground are displayed on said screen in real time concurrently with said background execution of another thread, said keyboard having keys which may be struck by the operator at spaced time instants to provide a sequence of keystrokes with respective time intervals between each pair of successive keystrokes, said central processing means executing said foreground thread in response to said keystrokes, and said central processing means executing said background thread during said time intervals between pairs of successive keystrokes.

24. An operator-interactive preemptive multithreading software-programmable general-purpose personal microcomputer system for concurrent execution of a plurality of instruction threads located within the same software program and comprising a microprocessor having an interrupt input, means to cause the microprocessor to execute one of said threads under control of said one thread, clock driven means for periodically activating said interrupt input at brief predetermined time intervals so as to interrupt the execution of an executing thread upon each activation of said interrupt input, an interrupt service routine for preemptively taking control of the microprocessor in response to each said activation of said interrupt input and including means for passing control of the microprocessor to another of said threads of said software program for execution of said another thread, operator actuated means for interactively controlling the execution of at least one of said program threads during the execution of said one thread, and display means for interactively showing to the operator the effects of said operator actuated control, whereby a thread of a program may execute interactively with the operator in the foreground while another thread of the same program executes in the background concurrently with the interactive execution of the foreground thread, and said clock driven means and interrupt service routine coacting to switch control of the microprocessor repeatedly between the foreground and background threads so rapidly that an interactive operator perceives the foreground and background threads to be executing simultaneously.

25. A multithreading microcomputer system as recited in claim 24 wherein each of said threads has a respective task to execute, each thread having a respective series of spaced timeslices of execution with the timeslices of each series interleaved with the timeslices of at least one other series, said interrupt service routine preemptively taking control of the microprocessor from an executing thread at the end of its timeslice after the executing thread has executed only a portion of its task, whereby the task of each thread is executed piecewise with the successive executed task portions of each thread interleaved with the successive executed task portions of at least one other thread.

26. A preemptive multithreading software-programmable general-purpose computer system for concurrent execution of a multithreaded software program having a plurality of concurrently executable instruction threads, said computer system comprising a central processor having an interrupt operation and means for executing a thread under control of the latter, a memory, a clock timer for periodically activating said interrupt operation at brief predetermined time-sliced intervals so as to interrupt the execution of an executing thread and to take therefrom control of the central processor upon each said activation of said interrupt operation, and an interrupt service routine responsive to each said clock timer activation of said interrupt operation for passing control of the central processor to another of said threads of said multithreaded software program for execution of said another thread, said clock timer, interrupt operation and interrupt service routine coacting to switch control of the central processor from one thread to another thread repeatedly and rapidly so that the threads effectively execute simultaneously.

27. A multithreading computer system as recited in claim 26 wherein each of said threads has a respective task to perform, said periodic activation of said interrupt operation by said clock timer providing for the execution of each thread a respective series of said spaced time-sliced intervals with the time-sliced intervals of each series interleaved with the time-sliced intervals of at least one other series, said interrupt service routine repeatedly preemptively taking control of the central processor from at least one executing thread at the end of its time-sliced interval after the executing thread has performed only a portion of its task.

28. A multithreading computer system as recited in claim 27 and comprising means for passing control of the central processor from an executing thread to another thread before the end of the time-sliced interval of the executing thread whenever the executing thread has voluntarily relinquished said control.

29. A multithreading computer system as recited in claim 26 wherein said program is an operator-selectable user application program, operator actuated means for selecting said user application program for execution and for loading said user application program into said memory, operator actuated means for interactively controlling the execution of one of said program threads in the foreground, and display means for interactively showing to an operator the effects of said operator actuated control while another of said threads executes concurrently therewith in the background.

30. A multithreading computer system as set forth in claim 26 and comprising a memory comprising a plurality of addressable locations, and means for allocating at least a subset of said addressable memory locations and for providing said allocated subset to be the address space accessible by said software.

31. A multithreading computer system as recited in claim 26 wherein said memory comprises a plurality of addressable locations, means for allocating at least a subset of said addressable memory locations and for providing said allocated subset to be the address space accessible by said software, each of said threads having a respective task to perform, each thread having a respective series of spaced time-sliced intervals of execution with the time-sliced intervals of each series interleaved with the time-sliced intervals of at least one other series, said interrupt service routine preemptively taking control of the central processor from an executing thread at the end of its time-sliced interval after the executing thread has performed only a portion of its task, said interrupt service routine comprising a thread scheduler to pass control of the central processor to another thread to perform the next successive portion of the task of said another thread during the next successive time-sliced interval of the respective series of time-sliced intervals of said another thread, whereby the task of each thread is performed piecewise with the successive task portions of each thread interleaved with the successive task portions of at least one other thread, operator actuated means for interactively controlling the execution of one of said program threads, and display means for interactively showing to an operator the effects of said operator actuated control, said clock timer, interrupt service routine and control return means coacting to switch control of the central processor repeatedly between the threads so rapidly that an operator perceives the threads to be executing simultaneously.

32. A multithreading computer system as set forth in claim 26 and comprising a system resource, synchronizing means responsive to execution of one thread for indicating whether said system resource is ready for access by another thread, said another thread including means for waiting for access to said system resource until the latter is indicated by said synchronizing means to be ready for access by said another thread.

33. A multithreading computer system as recited in claim 26 wherein each of said threads has a respective task to perform, each thread having a respective series of spaced time-sliced intervals with the intervals of each series interleaved with the intervals of at least one other series, said interrupt service routine preemptively taking control of the central processor from an executing thread at the end of its then current time-sliced interval at which time the executing thread has performed only a portion of its task, said interrupt service routine comprising means to pass control of the microprocessor to another thread to perform a next successive portion of the task of said another thread during a next successive time-sliced interval of the respective series of time-sliced intervals of said another thread, whereby the task of each thread is performed piecewise with the successive task portions of each thread interleaved with the successive task portions of at least one other thread.

34. A multithreading computer system as recited in claim 26 wherein said program is an operator-selectable application program, operator actuated means for selecting said application program and for loading said application program into said memory, operator actuated means for interactively controlling the execution of one of said program threads, and display means for interactively showing to an operator the effects of said operator actuated control, whereby a thread of a program may execute interactively with the operator in the foreground while another thread of the same program executes in the background concurrently with the execution of the foreground thread, and said clock timer, interrupt operation and interrupt service routine coacting to switch control of the central processor repeatedly between the foreground and background threads so rapidly that an interactive operator perceives the foreground and background threads to be executing simultaneously.

35. A multithreading computer system as set forth in claim 34 wherein said operator actuated means comprises a keyboard, and said display means comprises a video terminal having a viewing screen, whereby the effects of actuation of the keyboard upon the execution of said one thread in the foreground are displayed on said screen in real time concurrently with said background execution of another thread.

36. A multithreading computer system as set forth in claim 35 wherein said keyboard has keys which may be struck by the operator at spaced time instants to provide a sequence of keystrokes with respective time intervals between each pair of successive keystrokes, said central processor executing said foreground thread in response to said keystrokes, and said central processor executing said background thread during said time intervals between pairs of successive keystrokes.

* * * * *

(12) EX PARTE REEXAMINATION CERTIFICATE (7452nd)
United States Patent
Reiffin

(10) Number: US 5,694,604 C1
(45) Certificate Issued: Apr. 13, 2010

(54) PREEMPTIVE MULTITHREADING COMPUTER SYSTEM WITH CLOCK ACTIVATED INTERRUPT

(76) Inventor: Martin G. Reiffin, 5439 Blackhawk Dr., Danville, CA (US) 94506

Reexamination Request:
No. 90/006,621, May 6, 2003

Reexamination Certificate for:
Patent No.: 5,694,604
Issued: Dec. 2, 1997
Appl. No.: 08/217,669
Filed: Mar. 25, 1994

Related U.S. Application Data

(63) Continuation of application No. 07/496,282, filed on Mar. 20, 1990, now Pat. No. 5,694,603, which is a continuation of application No. 06/719,507, filed on Apr. 3, 1985, now abandoned, and a continuation of application No. 06/425,612, filed on Sep. 28, 1982, now abandoned.

(51) Int. Cl.
G06F 9/46 (2006.01)
G06F 9/48 (2006.01)

(52) U.S. Cl. ........................................ 718/107
(58) Field of Classification Search ................ None
See application file for complete search history.

(56) References Cited

U.S. PATENT DOCUMENTS 4,641,264 A * 2/1987 Nitta et al. ................ 704/4

OTHER PUBLICATIONS

"Programming the Z–80", Rodnay Zaks, Copy 1982, Sybex Inc.*
Morrison, Data Stream Linkage Mechanism, IBM Syst J, 1978, pp. 383–408, vol. 17, No. 4, International Business Machines Corporation, U.S.A.
Kroeker, et al., The Texas Instruments Microprocessor Pascal System, pp. 1–7, vol.–Issue 14/3, Advanced Software Technology Department, Texas Instruments, Inc., Dallas, Texas, U.S.A.

* cited by examiner

Primary Examiner—Majid A. Banankhah

(57) ABSTRACT

A multithreading computer system provides concurrent asynchronous preemptive time-sliced execution of a plurality of threads of instructions located within the same software program. A clock or timer periodically activates the interrupt operation of the central processor. Each interrupt preempts an executing thread after the thread has executed for a brief timeslice during which the thread may have performed only a portion of its task. Control of the processor is thereby taken away from the preempted thread, and control then passes to an interrupt service routine which then passes control to another thread to invoke the latter for execution during the next timeslice. Control is thereafter returned to the preempted thread to enable the latter to resume execution at the point where it was previously interrupted. Control of the processor is thus transferred repeatedly back and forth between the threads so rapidly that the threads are run substantially simultaneously. The threads may thus execute incrementally and piecewise with their successive task portions executed alternately in a mutually interleaved relation and with each thread executed during its respective series of spaced timeslices interleaved with the timeslices of at least one other thread.

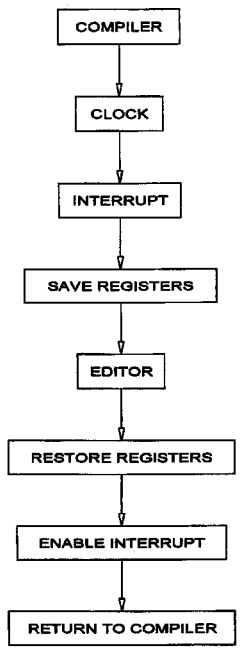

EX PARTE
REEXAMINATION CERTIFICATE
ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 1, lines 26–44:

The term "multithreading" is used in this specificaiton in its ordinary generally understood sense to mean the concurrent asynchronous preemptive time-sliced execution of a plurality of threads of instructions located within the same software program, controlled by a clock or timer which periodically activates the interrupt operation of the central processor. That is, each interrupt preempts an executing thread after the thread has executed at most for a brief timeslice during which the thread may have performed only a portion of its task. Control of the processor is thereby taken away from the preempted thread, and control then passes to an interrupt service routine which then passes control to another thread to invoke the latter for execution during the next timeslice. Control is thereafter returned to the preempted thread to enable the latter to resume execution at the point where it was previously interrupted. The term "multithreading" in each claim is to be understood as defined by the respective limitations [reeked] *recited* in that particular claim.

Column 2, insert after line 14:

*As first disclosed in said prior application Ser. No. 425,612 filed Sep. 28, 1982, and then disclosed again in said prior application Ser. No. 719,507 filed Apr. 3, 1985, and then disclosed again in said prior application Ser. No. 496,282, filed Mar. 20, 1990, now U.S. Pat. No. 5,694,603: In addition to translation, the compiler must also perform lexical, syntactic and semantic analyses of the source code. Lexical analysis is performed by a "scanner" and is the process of grouping a sequence of source code bytes into symbols or tokens and determining their correctness, somewhat like grouping a sequence of characters into English words. If the sequence of bytes does not constitute a properly spelled symbol an error message is emitted. These symbols are then subjected to the syntactic analysis by a "parser" which determines if they are arranged in a relation which conforms to the rigid grammatical rules of the programming language. The semantic analysis determines if the symbols conform to additional rules which cannot be conveniently expressed by the language grammar. These analyses are very much like parsing the words of an English sentence. If the sequence of symbols violates a syntactic or semantic rule an "error" is said to have been committed and the compiler must so inform the programmer by emitting a visible error message.*

*As disclosed in said prior copending application Ser. No. 496,282 filed Mar. 20, 1990: The language or other alphanumeric code processed by the present invention may be either a natural language such as English, or a formal language such as a programming language, or the numbers and strings of a spreadsheet or database. Both natural and formal languages are generally written in the same ASCII code, and the methods of lexical and syntactic analysis and the mode of operation of the present invention are substantially the same for both natural and formal languages. Spreadsheet and database entries are also generally entered in the ASCII code or the equivalent binary code. For purposes of illustration of the structure and operation of the present invention the disclosed embodiment is shown and described herein as a processor of a formal language; that is, a compiler of a programming language. However, it will be understood that substantially the same structure, operation, and lexical and syntactic analyses may be employed to process the code of a natural language, such as, for example, by utilizing lexical analysis to determine correct spelling and/or syntactic analysis to determine correct grammar of the natural language code being entered by an editor or word processor, or to process the code of a spreadsheet or database. The term "data" in the phrase "date code" is used to distinguish the language code or other code being processed from the instruction code which is executed by the central processing unit to perform the processing.*

*Similar inconveniences arise in the entry and editing of both formal and natural language code when using editors or word processors of the prior art. If the operator desires to check the spelling or grammar of the language code being typed or edited the operator must interrupt the entry or editing operation and invoke a lexical analyzer to check the spelling or a syntactic analyzer to check the grammar. The inconvenience is such that the checking is usually not done until after the job is finished, so that the same errors of spelling and grammar are repeated throughout the document being entered.*

AS A RESULT OF REEXAMINATION, IT HAS BEEN DETERMINED THAT:

Claims 1–36 are cancelled.

* * * * *